United States Patent [19]

Shiga et al.

[11] Patent Number: 4,548,536
[45] Date of Patent: Oct. 22, 1985

[54] WORKING APPARATUS WITH TRACK FOLLOWING MOTION

[75] Inventors: Tokio Shiga, Okazaki; Keiichi Saida, Tokoname, both of Japan

[73] Assignees: Toyoda Koki Kabushiki Kaisha; Kabushiki Kaisha Chubu Netsuren Kenkyusho, both of Kariya, Japan

[21] Appl. No.: 442,659

[22] Filed: Nov. 18, 1982

[30] Foreign Application Priority Data

Nov. 27, 1981 [JP] Japan ................................ 56-191421
Dec. 11, 1981 [JP] Japan ................................ 56-200681
Apr. 14, 1982 [JP] Japan ................................ 57-63116

[51] Int. Cl.$^4$ ....................... B65G 47/06; B65G 39/08
[52] U.S. Cl. ..................................... 414/225; 901/20; 198/468.2; 414/744 A; 414/751
[58] Field of Search ........... 414/744 R, 744 A, 744 B, 414/744 C, 696, 682, 222–225, 751; 198/486, 409, 473; 104/247, 245; 901/20

[56] References Cited

U.S. PATENT DOCUMENTS 1,888,440 11/1932 Waugh, Jr. ................. 414/744 A X
3,731,822 5/1973 Friesen et al. .............. 414/744 R X
4,341,502 7/1982 Makino ........................ 414/744 R
4,351,241 9/1982 Brems et al. ................. 198/473 X
4,359,945 11/1982 Brems et al. ................. 198/473 X Primary Examiner—Terrance L. Siemens Attorney, Agent, or Firm—Oblon, Fisher, Spivak, McClelland & Maier

[57] ABSTRACT

A working apparatus is provided with a head support horizontally pivotably carried by a link mechanism having first and second link elements, which mechanism is operable for horizontally freely moving the head support. The head support is provided with a follower roller, which is horizontally moved along a guide track, so that a working head such as a workpiece loading and unloading device mounted on the head support can be moved along the guide track between first and second service positions which are respectively located over a machine tool and a workpiece conveyer. In order to secure contact engagement between the follower and the guide track, the follower in one specific configuration is constructed by a magnet roller and in another specific configuration, is constructed by a roller which is urged to contact the guide track by a pressure roller movable together with the roller along guide track. The follower in still another specific configuration is constructed by a member slidably movable along a guide groove formed in the guide track. The drive device is constructed by a motor for rotating the follower roller. Further, the head support is horizontally pivotably carried by the link mechanism, and a mechanism is provided for controlling the horizontal angular direction of the working head in connection with the movement of the follower roller along the guide track.

29 Claims, 20 Drawing Figures

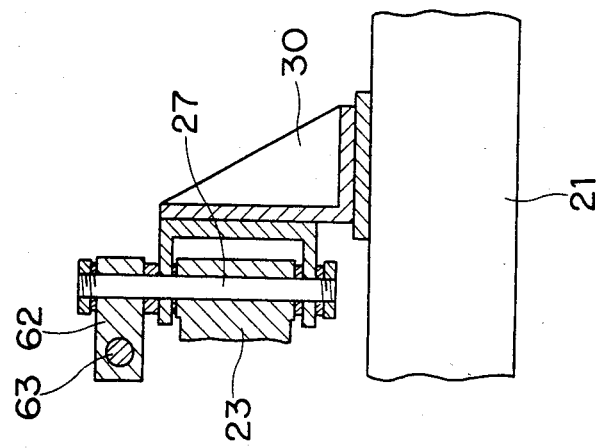
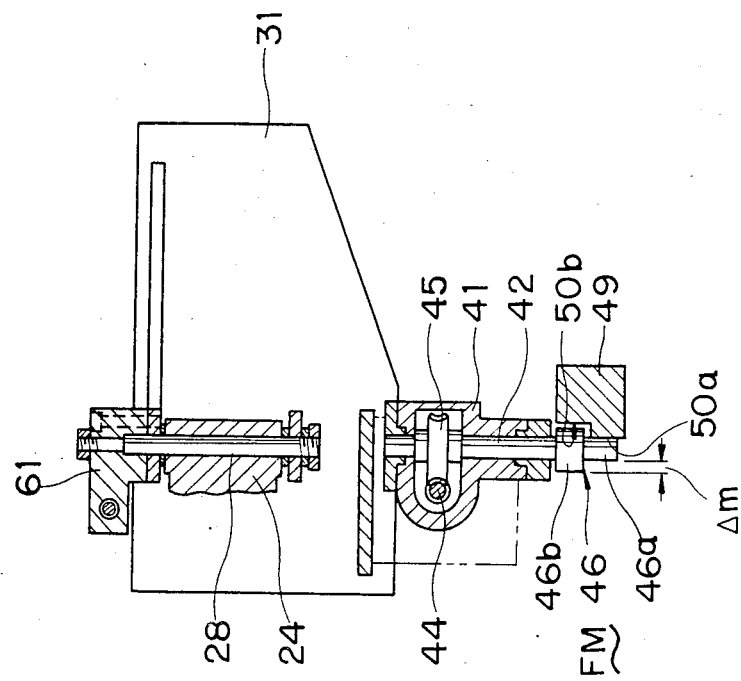

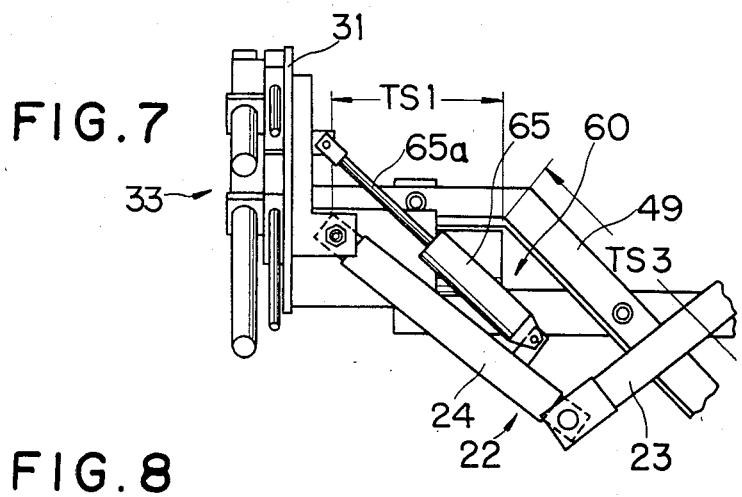
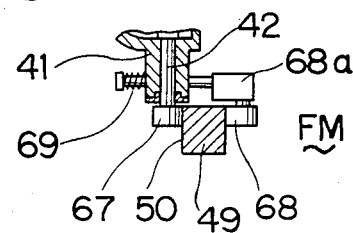
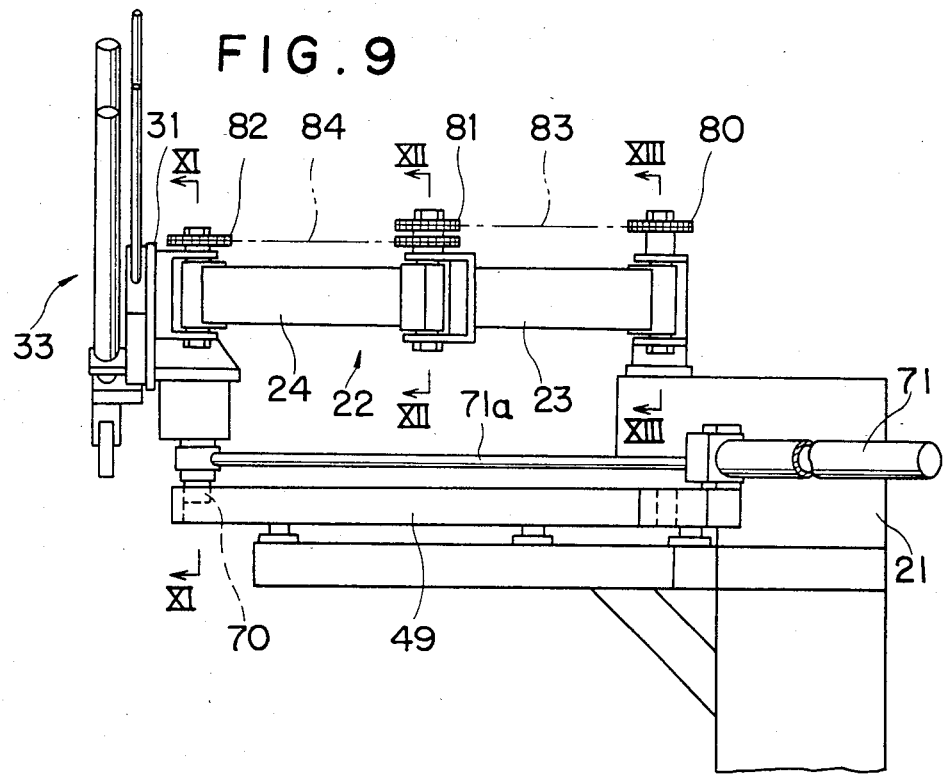

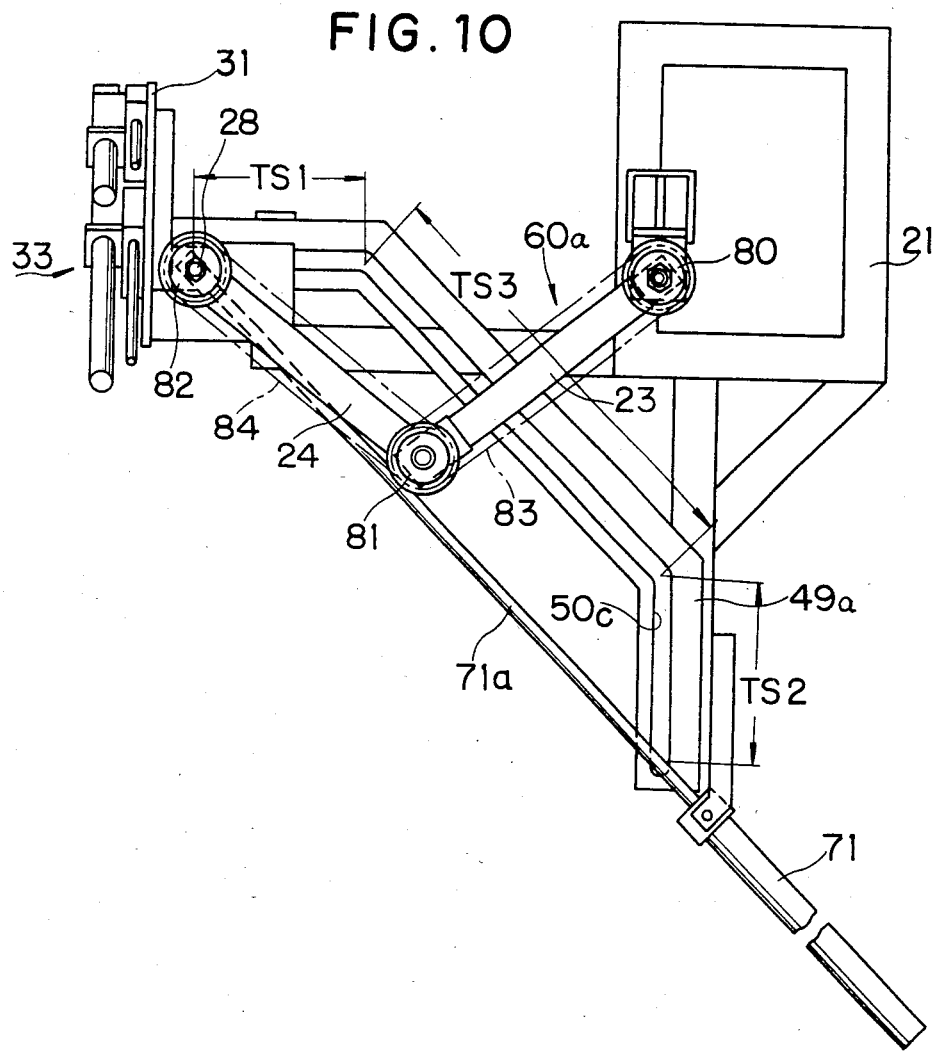

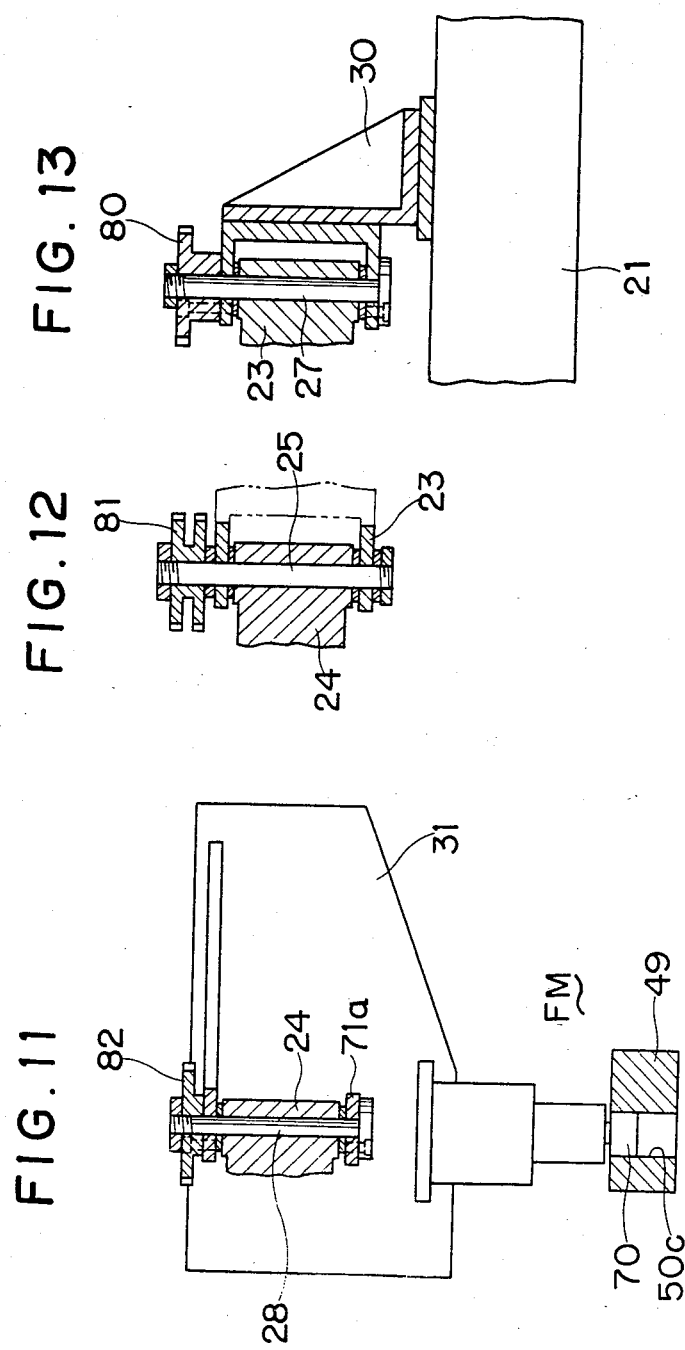

WORKING APPARATUS WITH TRACK FOLLOWING MOTION

BACKGROUND OF THE INVENTION

1. Field of the Invention

The present invention relates to a working apparatus which track following motion of the type that a working head such as, for example, a workpiece loading and unloading device is displaced following a predetermined course for performing loading and unloading operations at one or more positions on the course.

2. Description of the Prior Art

Generally, a full automatic machine tool is provided at its front side with a loading and unloading apparatus, which is moved between the machine tool and a conveyer installed in front thereof for loading and unloading workpieces therebetween.

However, the provision of the loading and unloading apparatus and the conveyer at the front side of the machine tool makes a front space of the machine tool narrow, thereby imposing restraints on operator's actions for observation of the machine operational state and service.

Further, there is known an overhead-type loading and unloading apparatus, wherein manipulators are moved along a guide rail, which is provided over a machine tool so as to secure a sufficient working space for an operator. The provision of the guide rail over the machine tool disadvantageously results in an increased scale and cost of the apparatus.

SUMMARY OF THE INVENTION

Accordingly, it is a primary object of the present invention to provide an improved working apparatus which is small and simple in construction and which, when used as a workpiece loading and unloading apparatus for a machine tool, is capable of securing a large working space for an operator servicing the machine tool.

Another object of the present invention is to provide an improved working apparatus of the character set forth above, which is capable of horizontally moving a working head such as, for example, a loading and unloading device through a reduced space, thereby leaving a large working space to an operator.

Another object of the present invention is to provide an improved working apparatus of the character set forth above, which, when used as, for example, a loading and unloading device, does not impose restraints upon the positions where two loading and unloading stations are respectively provided.

A further object of the present invention is to provide an improved working apparatus of the character set forth above, capable of orienting a working head thereof in a predetermined horizontal angular direction at each of at least two service positions horizontally spaced apart from each other.

A still further object of the present invention is to provide an improved working apparatus of the character set forth above, capable altering the moving locus of a working head by changing the configuration of a guide track along which a follower is moved.

A specific object of the present invention is to provide an improved working apparatus of the character set forth above, wherein a follower for controlling the movement of a working head can accurately and reliably follow even a sharply curved guide track by imparting rotational driving power to the follower.

Another specific object of the present invention is to provide an improved working apparatus of the character set forth above, wherein a follower movable along a guide track for controlling the movement of a working head is magnetically attracted to the guide track so that operator's service to the working apparatus for maintenance or repair can be carried out with the working head being located at a desired position not restrained by the guide track.

A further specific object of the present invention is to provide an improved working apparatus of the character set forth above, capable of automatically controlling the moving speed of a working head by using as a follower large and small diameter rollers alternately brought into contact engagement with a guide track.

Briefly, according to the present invention, there is provided a working apparatus, which comprises a support and transfer mechanism operably mounted on a fixed base and having first and second movable members for enabling a head support carried on the second movable member to be horizontally freely movable, a working head mounted on the head support for effecting a work, a follower horizontally movable bodily with the head support, a guide track for horizontally guiding the follower so as to present the working head selectively to at least two service positions, and a drive device for causing the follower to move along the guide track.

With this configuration, since the head support is enabled to horizontally freely move, the working head can be moved through a reduced space along the guide track. Accordingly, the working apparatus, when used as a workpiece loading and unloading apparatus for a machine tool, can leave a large working space to an operator servicing the machine tool.

In another aspect of the present invention, the support and transfer mechanism is constructed by a link mechanism, which advantageously makes the construction of the working apparatus simple.

In another aspect of the present invention, the follower is made of magnetic material, and this causes the follower to be brought into reliable contact engagement with the guide track.

In still another aspect of the present invention, the follower is rotated by the drive device and therefore, is enabled to accurately and reliably follow the guide track.

In still another aspect of the present invention, the follower movable along the guide track is constructed by large and small diameter rollers alternately engageable with the guide track. Because of the difference in diameter between the large and small diameter rollers, the moving speed of the working head can be automatically controlled even when the rollers are rotated by the drive device at a predetermined rotational speed.

In a further aspect of the present invention, the head support is horizontally pivotably carried by one of first and second link elements constituting the support and transfer mechanism, and an orientation control mechanism is further provided so that the orientation of the working head in a horizontal direction can be controlled.

BRIEF DESCRIPTION OF THE ACCOMPANYING DRAWINGS

The foregoing and other objects and many of the attendant advantages of the present invention will be readily appreciated as the same becomes better understood by reference to the following detailed description of preferred embodiments when considered in connection with the accompanying drawings, in which:

FIG. 5 is a sectional view of the working apparatus taken along the line V—V in FIG. 2;

FIG. 6 is a sectional view of the working apparatus taken along the line VI—VI in FIG. 2;

FIG. 7 is a partial plan view of a second embodiment of the working apparatus according to the present invention;

FIG. 8 is a fragmentary sectional view of a third embodiment of the working apparatus according to the present invention, corresponding to a part of FIG. 5;

FIG. 9 is a front view of a fourth embodiment of the working apparatus according to the present invention;

FIG. 10 is a plan view of the fourth embodiment;

FIG. 11 is a sectional view of the fourth embodiment taken along the line XI—XI in FIG. 9;

FIG. 12 is a sectional view of the fourth embodiment taken along the line XII—XII in FIG. 9;

FIG. 13 is a sectional view of the fourth embodiment taken along the line XIII—XIII in FIG. 9;

DETAILED DESCRIPTION OF THE PREFERRED EMBODIMENTS

Figures 1, 2:
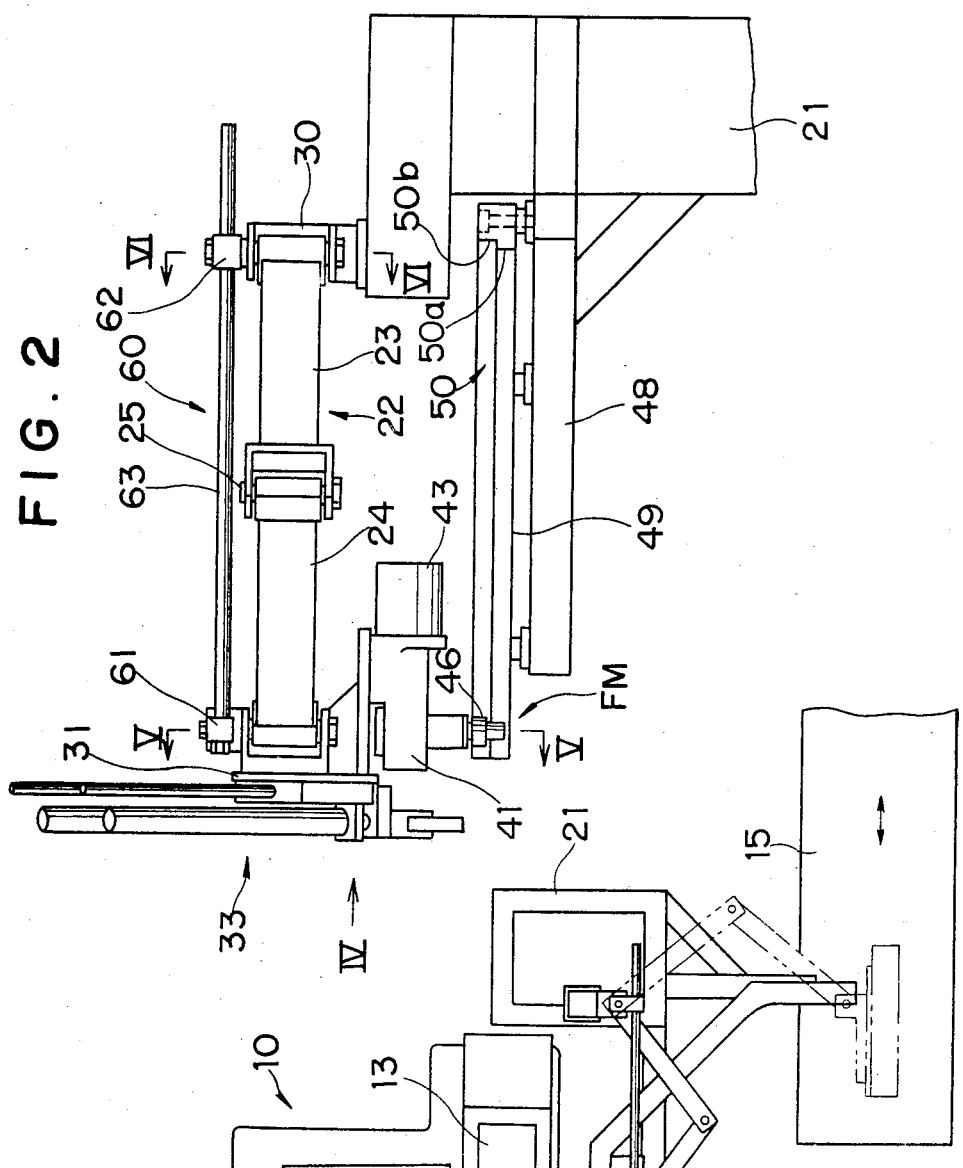
FIG. 1 is a plan view showing a working apparatus according to the present invention along with a machine tool and a conveyer.
FIG. 2 is a front view of the working apparatus according to the present invention.

Referring to the drawings, wherein like reference numerals designate identical or corresponding parts throughout the several views, and particularly to FIG. 1 thereof, a machine tool 10 is shown having a bed 11, on which a headstock 12, a footstock 13 and a wheel head 14 are mounted in a well known manner. A known conveyer 15 is installed at the front-right side of the machine tool 10 in parallel relation therewith. The working apparatus 20 with track following motion according to the present invention is provided between the machine tool 10 and the conveyer 15. The working apparatus 20 has portions overhanging the front side of the machine tool 10 from a fixed base 21 installed at the right side of the machine tool 10. Accordingly, a large space can be secured while the working apparatus 20 serves the conveyer 15.

Referring now to FIGS. 2 through 6 illustrating the detailed construction of the apparatus 20, the fixed base 21 mounts thereon a link mechanism 22, which acts as a weight support and transfer mechanism. The link mechanism 22 comprises a pair of pivotable link elements 23 and 24, which are coupled by means of a pivot shaft 25 extending in a vertical direction. One of the link elements 23 is carried by a bracket 30 fixed on the fixed base 21 for pivot motion about another pivot shaft 27 extending in a vertical direction, as shown in FIG. 6, and the other of the link elements 24 pivotally carries a support 31 through still another pivot shaft 28 extending in a vertical direction, as shown in FIG. 5. It is therefore apparent that the link mechanism 22 permits the free horizontal movement of the support 31.

Figure 4:
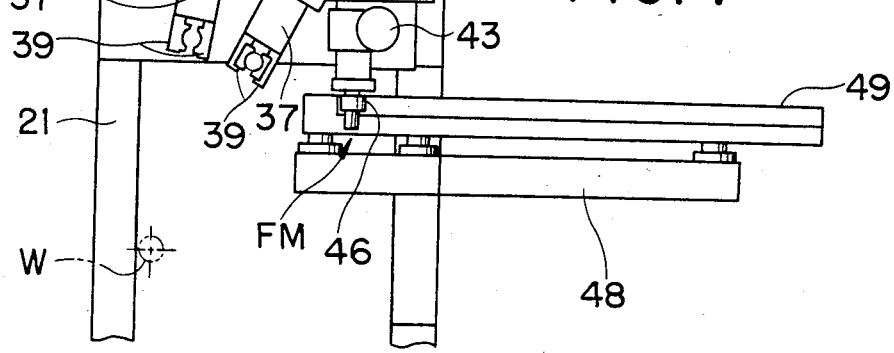
FIG. 4 is a side view of the working apparatus viewed from a direction indicated by the arrow IV in FIG. 2.

Mounted on the front surface of the support 31 as shown in FIG. 4 is a working head 33 comprising a pair of loading and unloading devices 34 and 35. Each of the loading and unloading devices 34 and 35 has a grip head 37 vertically movably supported by a support block 36 and is capable of loading and unloading workpieces W at each of service positions over the machine tool 10 and the conveyer 15 by vertically moving the grip head 37 by means of, for example, a hydraulic cylinder 38 and by effecting opening and closing motions of a pair of grippers 39.

As shown in FIGS. 2 and 5, the support 31 has fixed at its lower part a housing 41, in which a drive shaft 42 is rotatably carried in axial alignment with the pivot shaft 28. Driving power of a drive motor 43 secured to the housing 41 is transmitted via a worm 44 and a wormwheel 45 to the drive shaft 42, which thus rotationally drives a follower 46. The follower 46 constituting a follower mechanism FM comprises a roller made of magnet. This magnet roller 46 may be integral with the drive shaft 42 or removable therefrom for exchange with a spare roller having a different diameter.

Figure 3:
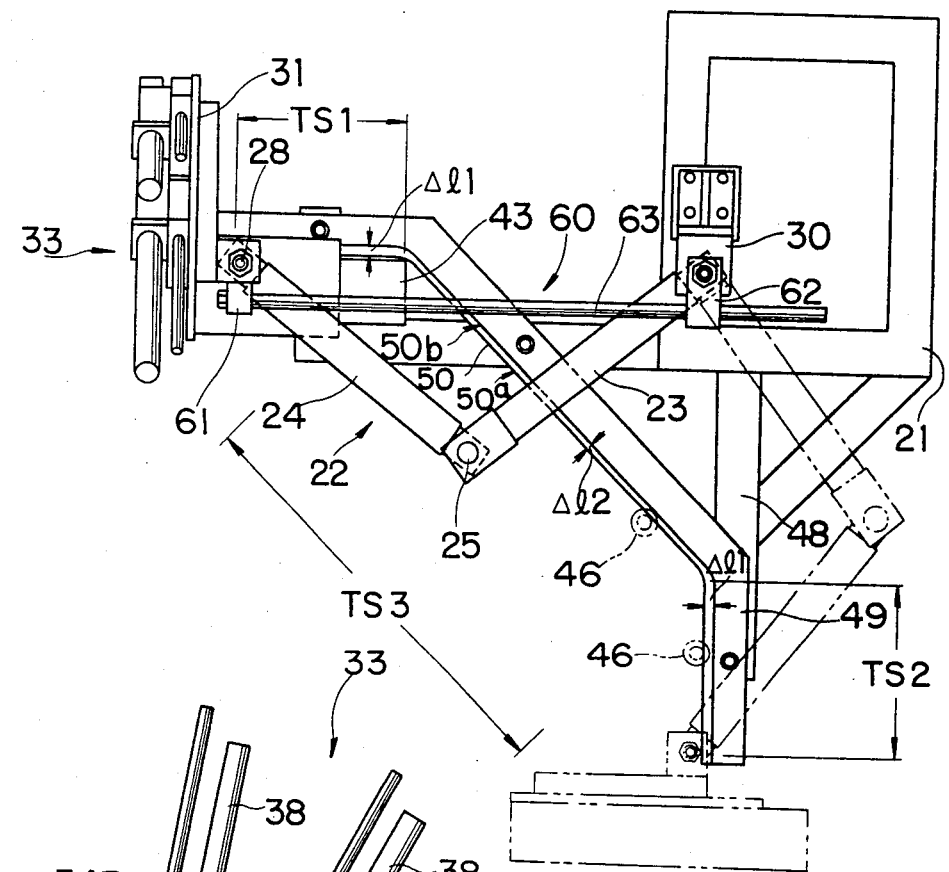
FIG. 3 is a plan view of the working apparatus.

Referring now to FIG. 3, a guide track 49 is secured to the lateral portion of the fixed base 21 through a track support bracket 48. The guide track 49 horizontally extends between the first and second service positions respectively over the machine tool 10 and the conveyer 15 and comprises a first track section TS1 approaching the first service position in a first direction and a second track section TS2 approaching the second service position in a second direction perpendicular to the first direction. The guide track 49 further comprises a third track section TS3 which connects the first and second track sections TS1 and TS2 via the shortest course. Being magnetically attracted to the guide track 49, the magnet roller 46, when rotated by the drive motor 43, is moved along a track surface 50 formed extending through the first to third track sections TS1-TS3, so that the working head 33 is displaced along the track surface 50.

The track surface 50 is composed of first and second track ways 50a and 50b, wherein the first track way 50a protrudes from the second track way 50b in a transverse direction of the track surface 50 a first distance Δl1 within each of the first and second track sections TS1 and TS2 and a second distance Δl2, shorter than the first distance Δl1, within the third track section TS3. The magnet roller 46 is formed with small and large roller portions 46a and 46b, which have a difference Δm between their radii. The dimensional relation of the radius difference Δm with the protruding amounts Δl1 and Δl2 of the first track way 50a from the second track way 50b is chosen to be Δl2 < Δm < Δl1. This enables the small and large roller portion 46a and 46b to alternately respectively contact the first and second track ways 50a and 50b when they are rotated, so that the driving speed of the roller 46 can be automatically controlled depending upon the contact state of the roller 46 with the track surface 50.

A reference numeral 60 designates an orientation control mechanism, which comprises a block 61 secured to the support 31, another block 62 pivotably carried by the pivot shaft 27, and a pilot bar 63. This bar 63 is fixed by the block 61 and slidably passes through the block 62, so that the support 31 can be controlled to always orient in a radial direction of the pivot shaft 27.

The operation of the apparatus as constructed above will now be described with reference to FIGS. 1–6.

It is now assumed that the working apparatus 20 is in such a state as to present the working head 33 over the machine tool 10, as shown in FIG. 1. In this state, when the machining of the workpiece W is completed, the loading and unloading device 34 is operated to unload the finished workpiece W from the machine tool 10, and the loading and unloading device 35 is then operated to load an unfinished workpiece W onto the machine tool 10. Upon completion of the unloading and loading of the workpieces W, the magnet roller 46 is rotated by the drive motor 43 and is moved along the track surface 50 while being magnetically attracted thereto. The magnet roller 46 is moved at a slow speed within the first track section TS1 because of the small roller portion 46a contacting the first track way 50a and then, is moved at a high speed within the third track section TS3 because of the large roller portion 46b contacting the second track way 50b. Within the second track section TS2, the small roller portion 46a is brought into contact with the first track way 50a again, whereby the magnet roller 46 is moved at the slow speed. In this manner, the magnet roller 46 is displaced throughout each of the first to third track sections TS1–TS3 at a speed suitable for smooth operation.

The link mechanism 22 performs extension and retraction motions and pivot motion while the magnet roller 46 is moved. This causes the support 31 and the working head 33 mounted on one end of the link mechanism 22 to move from the first or machine service position over the machine tool 10 to the second or conveyer service position over the conveyer 15. During this transfer movement, the orientation control mechanism 60 forces the support 31 to orient in a radial direction of the pivot shaft 27.

When the working head 33 is presented over the conveyer 15, namely to the conveyer service position as indicated by the phantom line in FIGS. 1 and 3, the operation of the drive motor 43 is discontinued, whereupon the pair of the loading and unloading devices 34 and 35 are alternately operated so as to pick up an unfinished workpiece W from the conveyer 15 and unload the finished workpiece W onto the conveyer 15. Upon completion of the unloading and loading operations with respect to the conveyer 15, the reverse rotation of the magnet roller 46 is effected by the drive motor 43. Consequently, the working head 33 is pivotally returned to the machine service position over the machine tool 10 in a manner reverse to the aforementioned operations and makes itself ready for subsequent unloading and loading operations.

FIG. 7 shows a second embodiment of the apparatus 20 according to the present invention, wherein the orientation control mechanism 60 is modified by pivotably connecting an orientation control hydraulic cylinder 65 with the second link element 24 and horizontally pivotably connecting the outer end of a piston rod 65a of the cylinder 65 with the support 31. The cylinder 65 is operated at each of the machine service position and the conveyer service position, so that the orientation of the loading and unloading devices 34 and 35 can be changed in conformity with the positions of the workpieces W to be unloaded and loaded.

FIG. 8 shows a third embodiment of the apparatus 20 according to the present invention, wherein a modification is made with respect to the follower mechanism FM. The drive shaft 42 in this embodiment carries at its lower end a friction roller 67 made of rubber, and a pressure roller 68 is disposed in an opposite side of the guide track 49. A member 68a carrying the pressure roller 68 is carried by the housing 41 to be slidable in such a direction as to move the pressure roller 68 toward and away from the friction roller 67. A compression spring 69 is interposed between the member 68a and the housing 41 to urge the friction roller 67 and the pressure roller 68 to be pressured upon the guide track 49. This arrangement enables the friction roller 67 rotated by the drive motor 43 to move along the guide track 49 through friction engagement therewith.

FIGS. 9 through 13 show a fourth embodiment of the apparatus 20 according to the present invention, wherein the guide track 49a is formed with a guide groove 50c in place of the aforementioned track surface 50. As best shown in FIG. 11, a cylindrical follower 70 is fixedly provided on the support 31 in axial alignment with the axis of the pivot shaft 28 and is snugly received in the guide groove 50c, so that the support 31 and the working head 33 are movable along the guide groove 50c. As a drive device for operating the link mechanism 22, there is provided a hydraulic cylinder 71, which is horizontally pivotably supported by the fixed base 21 at a position located on an extension of a line extending between opposite ends of the guide groove 50c. An outer end of a piston rod 71a of the cylinder 71 is horizontally pivotably connected to the pivot shaft 28. This arrangement enables the cylindrical follower 70 to move through the entire length of the guide groove 50c at the time of the actuation of the cylinder 71. The orientation control mechanism 60a in this embodiment comprises a nonrotatable sprocket 80 secured to the fixed base 21 in coaxial alignment with the pivot shaft 27, an idle sprocket 81 rotatably carried on the pivot shaft 25, a drive sprocket 82 secured to the support 31 in axial alignment with the pivot shaft 28, and a pair of endless chains 83 and 84 respectively wound between the sprockets 80 and 81 and between the sprockets 81 and 82.

When the support 31 is pivoted about the pivot shaft 27 a predetermined angle in one direction, the orientation control mechanism 60a in this fourth embodiment causes the support 31 to pivot the same angle as the predetermined angle about the pivot shaft 28 in an opposite direction. As a result, the support 31 is maintained to orient in a predetermined direction relative to a fixed portion. Accordingly, the fourth embodiment is adapted for use in the case where the conveyor 15 extends in a direction perpendicular to the direction shown in FIG. 1.

It is to be noted that the weight support and transfer mechanism of the working apparatus 20 according to the present invention is not limited to the link mechanism 22 described in the first embodiment, and that the mechanism may be of any other suitable construction instead of the link mechanism 22. For example, the mechanism may be comprised of a first movable member horizontally movable in a first direction and a second movable member mounted on the first movable member and horizontally movable in a second direction transverse to the first direction. In this case, the working head 33 is mounted on the second movable member and is horizontally moved in the first and second directions through the relative movements of the first and second movable members.

Figure 14:
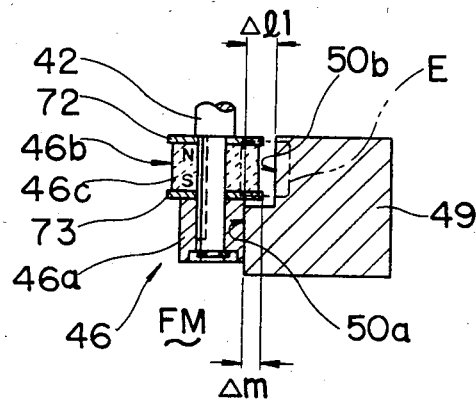
FIG. 14 is a fragmentary sectional view of a fifth embodiment of the working apparatus according to the present invention, corresponding to a part of FIG. 5.
Figure 15:
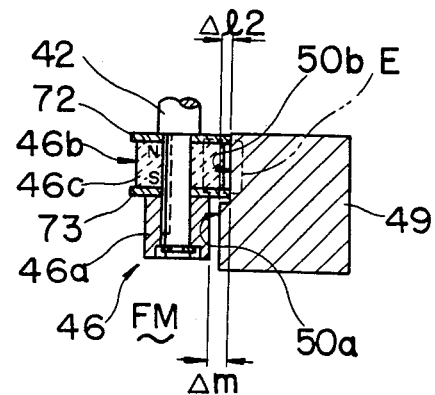
FIG. 15 is a fragmentary sectional view similar to FIG. 14, but showning a different state of operation.

FIGS. 14 and 15 show a fifth embodiment of the working apparatus 20 according to the present invention, wherein a modification is made with the follower mechanism FM described in the aforementioned first embodiment. The follower 46 in this embodiment comprises large and small rollers 46b and 46a having a difference Δm between their radii and fixedly mounted on the drive shaft 42 in coaxial alignment therewith. The small roller 46a is made of iron, while a body piece 46c of the large roller 46b is made of magnet having N- and S-poles respectively at upper and lower ends thereof. The large roller 46b has secured to the upper and lower ends of the body piece 46c a pair of discs 72 and 73 made of a magnetic material, which provide a path (E) for magnetic flux leading to the guide track 49, thereby resulting in a decreased leakage of the magnetic flux and an increased magnetic attractive force. Preferably, the drive shaft 42 may be made of a non-magnetic material in order to prevent the magnetic flux from leaking through the drive shaft 42.

Figure 16:
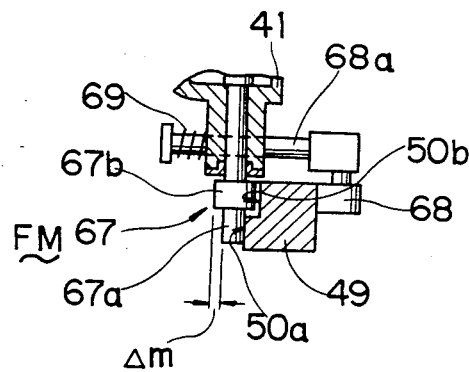
FIG. 16 is a fragmentary sectional view of a sixth embodiment of the working apparatus according to the present invention, particularly showing a modification of the mechanism shown in FIG. 8.
Figure 17:
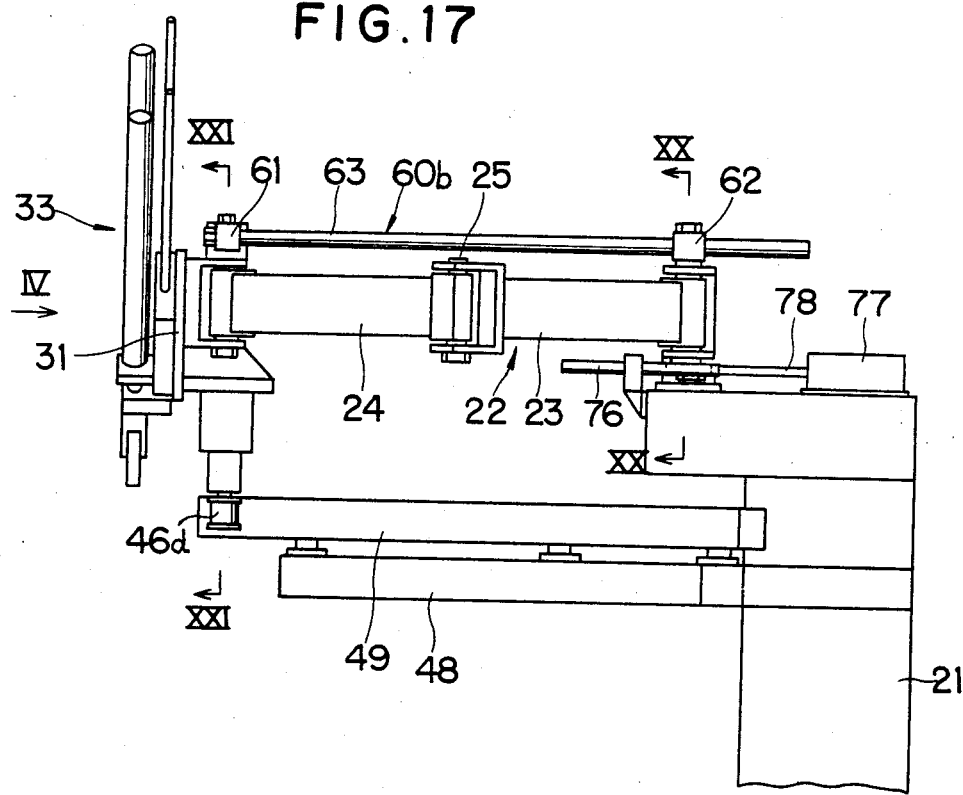
FIG. 17 is a front view of a seventh embodiment of the working apparatus according to the present invention.
Figure 18:
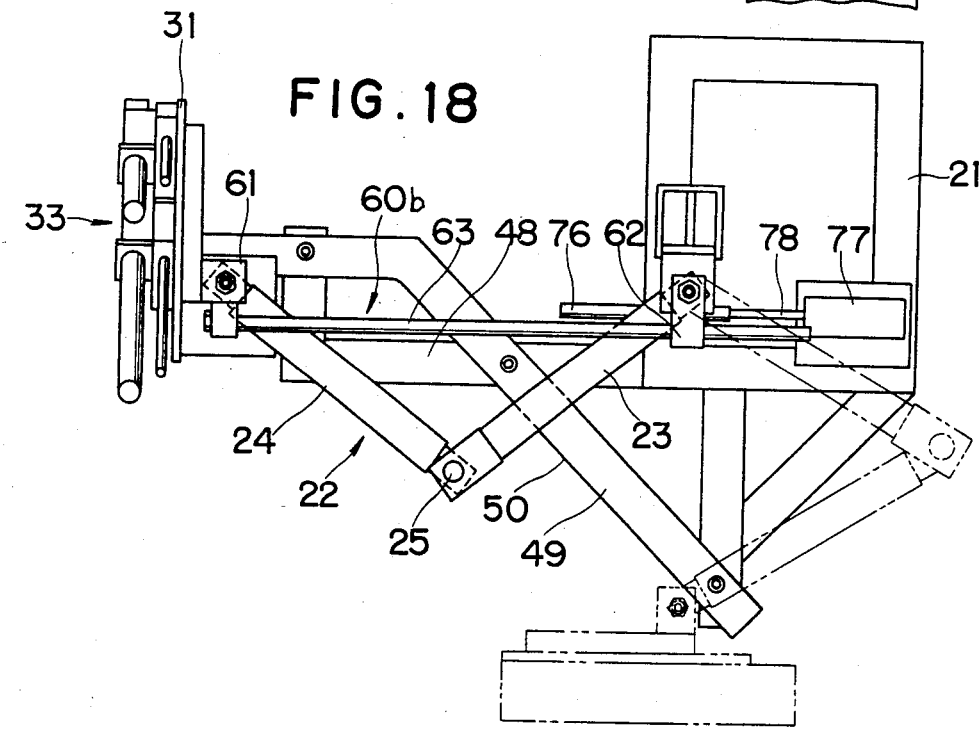
FIG. 18 is a plan view of the seventh embodiment.
Figure 20:
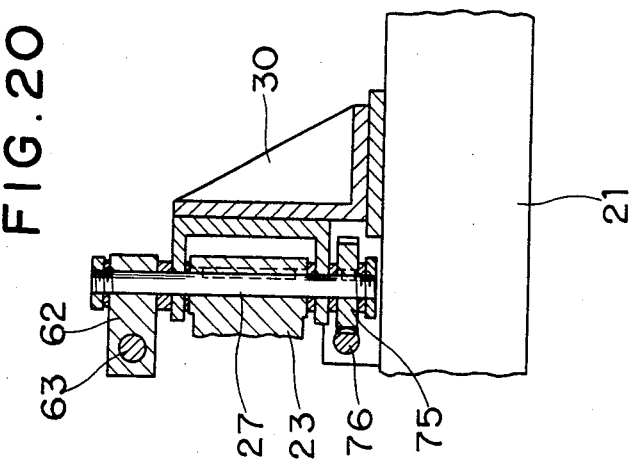
FIG. 20 is a sectional view of the seventh embodiment taken along the line XX—XX in FIG. 17.
Figure 19:
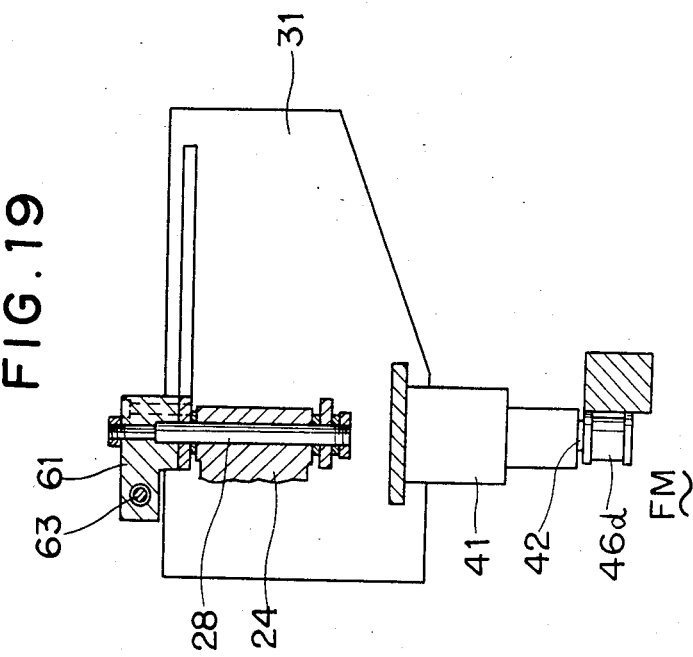
FIG. 19 is a sectional view of the seventh embodiment taken along the line XXI—XXI in FIG. 17.

FIG. 16 shows a sixth embodiment of the apparatus 20 according to the present invention, wherein a further modification is made with the follower mechanism FM described in the aforementioned third embodiment with reference to FIG. 8. This embodiment is different from the third embodiment in that the follower 67 comprises small and large rubber rollers 67a and 67b and that the guide track 49 has the same configuration as that which is described in the first embodiment and shown in FIGS. 3 through 5. This embodiment therefore features an automatic driving speed control function in addition to the features of the third embodiment.

As mentioned earlier, the small and large rollers 46a and 46b (or 67a and 67b) are alternately brought into contact with the first and second track ways 50a and 50b when moved along the entire length of the guide track 50. It is therefore understood that each of the first and second track ways 50a and 50b need not extend through the entire length of the guide track 50; the first way 50a may extend through only the first and second track sections TS1 and TS2 and the second track way 50b only through the third track section TS3.

FIGS. 17 through 20 show a seventh embodiment of the working apparatus 20 according to the present invention, having an orientation control mechanism 60b and wherein a hydraulic cylinder 77 is provided for effecting extension and retraction movements of the link mechanism 22. The cylinder 77 is mounted on the fixed base 21 and is capable of reciprocatively moving a rack bar 76 coupled to a piston rod 78 thereof. The rack bar 76 is in meshing engagement with a pinion 75 keyed on the lower end of the pivot shaft 27. The link element 23 is also keyed on the pivot shaft 27 for pivot movement together with the pinion 75. The housing 41 secured to the support 31 has carried therein the drive shaft 42, which is freely rotatable about a vertical axis, and a magnet roller 46d of the same configuration as that of the large magnet roller indicated at 46b in FIG. 14 is mounted on the lower end of the drive shaft 42. When the cylinder 77 is actuated to pivot the link element 23, the magnetic attractive force of the roller 46d causes the link mechanism 22 to effect retraction and extension movements, whereby the roller 46d is moved along the entire length of the guide track 49. In this embodiment, it is possible to fixedly provide the cylinder 77 on the fixed base 21 and to diminish the stroke of the cylinder 77.

Obviously, numerous modifications and variations of the present invention is possible in light of the above teachings. It is therefore understood that within the scope of the appended claims, the invention may be practiced otherwise than as specifically described herein.

What is claimed as new and desired to be secured by Letters Patent of the United States is:

1. A working apparatus comprising in combination:
   a fixed base;
   a support and transfer mechanism operably mounted on said fixed base and having a first movable member horizontally movable relative to said fixed base and a second movable member horizontally movable relative to said fixed base and said first movable member;
   a head support provided on and carried by said second movable member;
   a working head mounted on said head support means for performing work;
   track means provided in a fixed relation with said fixed base and horizontally extending for enabling said working head to be presented selectively to at least two service positions;
   follower means carried by said head support and horizontally movable along said track means bodily with said head support; and
   drive means for eanbling said follower means to move along said track means so as to thereby present said working head selectively to said at least two service positions.

2. A working apparatus as set forth in claim 1, wherein:
   said first movable member comprises a first link element carried on said fixed base for horizontal pivot movement relative to said fixed base; and
   said second movable member comprises a second link element carried on said first link element for horizontal pivot movement relative to said first link element.

3. A working apparatus as set forth in claim 2, wherein said follower means comprises:
   follower roller means made of a magnetic material and supported by said head support for rolling along said track means.

4. A working apparatus as set forth in claim 3, wherein said head support is carried by said second link element for horizontal pivot movement relative to said second link element, further comprising:
   orientation control means connected to said head support for controlling the orientation of said head support in accordance with the moving position of said head support relative to said fixed base.

5. A working apparatus as set forth in claim 4, wherein said drive means comprises:
a drive motor mounted on said head support and drivingly connected to said follower roller means for rotating said follower roller means.

6. A working apparatus as set forth in claim 2, wherein said follower means comprises:
follower roller means rotatably supported by said head support for rolling along said track means; and
means provided on said head support for forcing said follower roller means to contact said track means.

7. A working apparatus as set forth in claim 6, wherein said head support is carried by said second link element for horizontal pivot movement relative to said second link element, further comprising:
orientation control means connected to said head support for controlling the orientation of said head support in accordance with the moving position of said head support relative to said fixed base.

8. A working apparatus as set forth in claim 7, wherein said drive means comprises:
a drive motor mounted on said head support and drivingly connected to said follower roller means for rotating said follower roller means.

9. A working apparatus as set forth in claim 8, wherein said means for forcing said follower roller comprises:
a pressure roller carried by said head support for movement toward and away from said follower roller means in a direction transverse to said track means and for rotation about an axis thereof extending in parallel relation with the axis of rotation of said follower roller means; and
urging means provided between said pressure roller and said head support means for urging said pressure roller to contact said track means to thereby contact said follower roller means with said track means.

10. A working apparatus as set forth in claim 9, wherein said follower roller means comprises:
large and small diameter rollers selectively engageable with said track means for controlling the moving speed of said head support.

11. A working apparatus as set forth in claim 10, wherein said track means comprises:
first and second track sections respectively extending in first and second horizontal directions perpendicular to each other; and
a third track section linearly interconnecting said first and second track sections.

12. A working apparatus as set forth in claim 11, wherein said working head comprises:
at least one grip head provided with a pair of movable grippers for handling an article and movable in a direction transverse to the moving direction of the head support along the track means; and
an actuator operably connected to said at least one grip head for moving said at least one grip head.

13. A working apparatus as set forth in claim 10, wherein said orientation control means comprises:
a first member pivotable relative to said fixed base and said first link element about a vertical axis about which said first link element is pivotable;
a second member secured to said head support; and
a rod fixed on one of said first and second members and snugly received in the other of said first and second members for sliding engagement.

14. A working apparatus as set forth in claim 10, wherein said orientation control means comprises:
a hydraulic cylinder interconnected between said second link element and said head support.

15. A working apparatus as set forth in claim 2, wherein said follower means comprises:
a roller shaft rotatably carried by said head support and drivingly connected to said drive means so as to be rotated thereby;
a pair of discs made of a magnetizable material and secured on said roller shaft in coaxial alignment with said roller shaft; and
a body piece made of a magnetic material, carried on said roller shaft, and interposed between said pair of said discs, said body piece being not engageable with said track means.

16. A working apparatus as set forth in claim 2, wherein said drive means comprises:
a pinion rotatable bodily with said first link element about a vertical axis;
a hydraulic cylinder mounted on said fixed base; and
rack means connected to said hydraulic cylinder for reciprocative movement and meshing with said pinion for pivotally moving said pinion and said first link element about said vertical axis.

17. A working apparatus as set forth in claim 1, wherein said support and transfer mechanism comprises:
a first vertical shaft provided on said fixed base;
a first link element acting as said first movable member and carried by said first vertical shaft for horizontal pivot movement relative to said fixed base;
a second vertical shaft carried by said first link element;
a second link element acting as said second movable member and carried by said second vertical shaft for horizontal pivot movement relative to said first link element; and
a third vertical shaft carried by said second link element and horizontally pivotally carrying said head support.

18. A working apparatus as set forth in claim 17, further comprising:
a first sprocket supported by said first vertical shaft and secured to said fixed base;
a pair of second sprockets carried by said second vertical shaft and bodily rotatable relative to said first and second link elements;
a third sprocket carried by said third vertical shaft and secured to said head support means for integral pivot movement together with said head support relative to said second link element; and
a pair of endless chains respectively wound between said first sprocket and one of said second sprockets and between the other of said second sprockets and said third sprocket;
whereby the orientation of said head support is invariable irrespective of pivot movements of said first and second link elements.

19. A working apparatus as set forth in claim 18, wherein said track means comprises:
first and second track groove sections respectively extending in first and second horizontal directions perpendicular to each other; and a third track groove section linearly interconnecting said first and second track groove sections;

said follower means being movable in said first, second and third track groove sections.

20. A working apparatus as set forth in claim 19, wherein said drive means comprises:

a hydraulic cylinder horizontally pivotably supported by said fixed base and having a piston rod pivotably connected to one of said second link element, said third vertical shaft and said head support means for moving said follower means along said first, second and third track groove sections.

21. A working apparatus as set forth in claim 20, wherein said hydraulic cylinder is horizontally pivotably carried by said fixed base at a position which is on an extension of a line connecting between an outer end of said first track groove section and an outer end of said second track groove section.

22. A working apparatus as set forth in claim 21, further comprising:

a first sprocket supported by said first vertical shaft and secured to said fixed base;

a pair of second sprockets carried by said second vertical shaft and bodily rotatable relative to said first and second link elements;

a third sprocket carried by said third vertical shaft and secured to said head support for integral pivot movement together with said head support relative to said second link element; and a pair of endless chains respectively wound between said first sprocket and one of said second sprockets and between the other of said second sprockets and said third sprocket;

whereby the orientation of said head support is invariable irrespective of pivot movements of said first and second link elements.

23. A working apparatus comprising in combination:

a fixed base;

a first link element carried on said fixed base for horizontal pivot movement relative to said fixed base;

a second link element carried on said first link element for horizontal pivot movement relative to said first link element;

a head support carried by said second link element for horizontal pivot movement relative to said second link element;

a working head mounted on said head support for performing work;

track means provided in a fixed relation with said fixed base and horizontally extending for enabling said working head to be presented selectively to at least two service positions;

large and small diameter rollers rotatably carried by said head support for movement along said track means and selectively engageable with said track means for controlling the moving speed of said head support, at least one of said large and small diameter rollers being made of a magnetic material so that said at least one of said large and small diameter rollers is forced to maintain contact with said track means;

a drive motor mounted on said head support and drivingly connected to said large and small diameter rollers for bodily rotating the same; and orientation control means connected to said head support for controlling the orientation of said head support in connection with the moving position of said head support relative to said fixed base.

24. A working apparatus as set forth in claim 23, wherein:

said large and small diameter rollers are provided in axial alignment with each other and are bodily rotatable about a vertical axis; and said track means is formed with first and second track ways horizontally extending on the levels respectively corresponding to said large and small diameter rollers, said first and second track ways being respectively formed on said track means in such a manner that said large and small diameter rollers are selectively respectively engaged with said first and second track ways when moved through the entire length of said track means.

25. A working apparatus as set forth in claim 24, wherein:

said first and second track ways extend through the entire length of said track means in parallel relation with each other, the space between said first and second track ways in a horizontal direction transverse to said first and second track ways being narrower at said at least one part of said track means and wider at said at least the other part of said track means than the difference between radii of said large and small diameter rollers.

26. A working apparatus as set forth in claim 25, wherein said track means formed with said first and second track ways comprises:

first and second track sections respectively extending in a first horizontal direction and a second horizontal direction perpendicular to said first horizontal direction; and a third track section linearly interconnecting said first and second track sections.

27. A working apparatus as set forth in claim 26, wherein said working head comprises:

at least one grip head provided with a pair of movable grippers for handling an article and movable in a direction transverse to the moving direction of the head support along the track means; and an actuator operably connected to said at least one grip head for moving said at least one girp head.

28. A working apparatus as set forth in claim 25, wherein said orientation control means comprises:

a first member pivotable relative to said fixed base and said first link element about a vertical axis about which said first link element is pivotable;

a second member secured to said head support; and a rod fixed on one of said first and second members and snugly received in the other of said first and second members for sliding engagement.

29. A working apparatus as set forth in claim 25, wherein said orientation control means comprises:

an hydraulic cylinder interconnected between said second link element and said head support.

* * * * *